(No Model.)

C. F. CHOATE.
BICYCLE BRAKE.

No. 559,996.  Patented May 12, 1896.

Witnesses,

Inventor,
Charles F. Choate
By Dewey & Co
Atty

UNITED STATES PATENT OFFICE.

CHARLES F. CHOATE, OF BENICIA, CALIFORNIA, ASSIGNOR OF ONE-HALF TO A. ROBINSON, OF SAME PLACE.

BICYCLE-BRAKE.

SPECIFICATION forming part of Letters Patent No. 559,996, dated May 12, 1896.

Application filed August 28, 1895. Serial No. 560,796. (No model.)

*To all whom it may concern:*

Be it known that I, CHARLES F. CHOATE, a citizen of the United States, residing at Benicia, county of Solano, State of California, have invented an Improvement in Bicycle-Brakes; and I hereby declare the following to be a full, clear, and exact description of the same.

My invention relates to a brake which is especially adapted for use upon bicycles.

It consists of the construction and combination of parts forming the improved brake hereinafter described and claimed.

Figure 1:
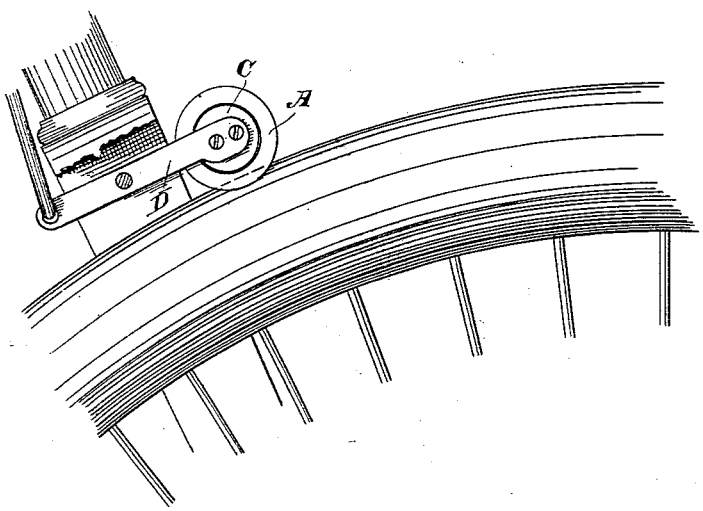
Figure 2:
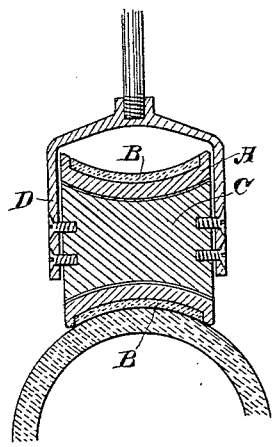

Figure 1 is a view showing the application of my improved brake. Fig. 2 is an enlarged sectional view of the brake.

A is an annular rim, the periphery of which may be made of any suitable or desired shape, either flat, or it may be concaved to approximately fit the outline of a bicycle-tire. The ends of this rim are also turned outwardly to form flanges, as shown in Fig. 2. Upon the periphery of this rim is fixed or formed a suitable frictional surface B, adapted to be confined between the end flanges of the rim and to form contact directly with the wheel rim or tire. Inside of this annular rim is a drum C, the outer periphery of which corresponds in shape with the inner surface of the annular rim, and these two surfaces are so constructed that when pressure is brought upon the exterior rim by bringing it forcibly into contact with the wheel-tire a retarding frictional contact will be brought about between the inner surface of the rim and the outer surface of the fixed drum, this being increased as the pressure increases, so that the brake may be applied with any desired degree of force without so entirely stopping the rotation of the annular rim as to destroy or injure the tire. The inner drum is secured between arms D, which are connected in any suitable manner, so that the outer rim or roller may normally remain out of contact with the wheel-tire, but may be moved into contact with the tire whenever desired. If applied to the front wheel of the machine, it may be connected with the plunger-rod of a direct-acting brake-lever, or it may be fulcrumed to the forks and have a lever connected with the outer end in such a manner as to properly apply it either by the hand-lever pressure or, if desired, it may be operated as a foot-brake.

It will be manifest that the device may be equally well applied to the rear wheel with any well-known or suitable means for bringing it into contact with the wheel whenever desired.

Having thus described my invention, what I claim as new, and desire to secure by Letters Patent, is—

An improved vehicle-brake consisting of arms and connections by which they are moved to and from the wheel-rim, a drum fixedly secured between said arms and having a concaved periphery, an exterior rim revoluble about the fixed drum and whose inner surface forms a retarding frictional contact with the exterior of the drum when pressure is applied to the rim, said rim having its ends turned outwardly to form flanges, and a concaved frictional surface secured to the revoluble rim and confined between the end flanges of the latter.

In witness whereof I have hereunto set my hand.

CHARLES F. CHOATE.

Witnesses:
A. ROBINSON,
JERRY LYNCH.